United States Patent [19]

Archer et al.

[11] Patent Number: 4,875,054

[45] Date of Patent: Oct. 17, 1989

[54] CLEAN AIR HOOD FOR FLUID JET PRINTING

[75] Inventors: Timothy H. V. Archer, Centerville; Randy Bowman, Franklin, both of Ohio; Michael I. Glenn, Burlington, N.C.

[73] Assignee: Burlington Industries, Inc., Greensboro, N.C.

[21] Appl. No.: 54,490

[22] Filed: May 27, 1987

[51] Int. Cl.⁴ .......................... G01D 15/18; B05B 5/02

[52] U.S. Cl. ........................................ 346/1.1; 346/75; 346/140 R; 239/3; 239/298

[58] Field of Search ....................... 346/1.1, 75, 140 R; 239/3, 298

[56] References Cited

U.S. PATENT DOCUMENTS

| | | | |
|---|---|---|---|
| 2,804,693 | 9/1957 | Brodie | 34/18 |
| 3,023,070 | 2/1962 | Benn | 346/153.1 |
| 3,434,416 | 3/1969 | Testone | 101/416 |
| 3,972,051 | 7/1976 | Lundquist et al. | 346/1.1 |
| 4,122,457 | 10/1978 | Erikson et al. | 346/75 |
| 4,545,525 | 10/1985 | Sachar et al. | 239/3 |
| 4,591,869 | 5/1986 | Katerberg et al. | 346/1.1 |
| 4,591,870 | 5/1986 | Braun et al. | 346/1.1 |

*Primary Examiner*—E. A. Goldberg
*Assistant Examiner*—Gerald E. Preston
*Attorney, Agent, or Firm*—Nixon & Vanderhye

[57] ABSTRACT

Disclosed is a clean air hood for disposition above the print head of a fluid jet printing apparatus having an orifice plate on one side of the print head for forming a plurality of droplet streams. The droplet streams flow past charge and deflection electrode means as well as a fluid catcher whereby uncharged droplets are deposited on a substrate. The clean air hood includes an interior baffle for directing clean air through the hood for issuance through a pair of laterally spaced slots along opposite sides of the hood whereby the air curtains formed thereby straddle the print head. In operation, the air curtains flow along opposite sides of the print head and opposite sides of the droplet streams ot maintain a clean air region about the electrode means and dampen any tendency of particulate matter carried by the substrate from migrating into the region of the electrodes. The print bar is rotated 180° to locate the orifice plate in opposition to the opening through the lower end of the hood whereby the orifice plate may be changed in a clean air region.

22 Claims, 3 Drawing Sheets

CLEAN AIR HOOD FOR FLUID JET PRINTING

BACKGROUND OF THE INVENTION

The present invention relates to fluid jet printing devices and particularly relates to apparatus and methods for providing a clean air region in a fluid jet printing device.

Generally, in fluid jet printing, a print head having a manifold provides fluid, e.g., ink, dye or other chemicals, to an orifice plate through which the fluid issues as a plurality of filaments which break up and form droplet streams. By locating charge electrodes adjacent the filaments, the droplets may be selectively and individually charged. By passing the charged and uncharged droplets through a field generated by a deflection electrode, the charged droplets are deflected from a predetermined path onto a collector for recycling back to the manifold. The uncharged droplets are not deflected and therefore fall on a substrate below the orifice plate. Thus, by selectively charging the droplets, in accordance with a predetermined information signal, pattern printing on a substrate may be effected.

When operating a fluid jet printing device of this type, it has been found that the droplet filaments may aspirate air from the surrounding environment. As a consequence, dust and other particulate matter contained in the surrounding ambient air may be drawn in and about the electrodes. Additionally, when the fluid jet printing device is used to chemically treat or to dye fabrics, lint from the fabric passing below in close proximity to the electrodes may be displaced from the fabric into the region of the electrodes. If this occurs, the electrodes may be short circuited to ground.

Further, it has been recognized that changes of the orifice plate are occasionally necessary and should be carried out in a clean air environment. This has been accomplished previously, by assignee of the present application, by removing the entire print head, including the manifold, and transporting the head to a clean room. There the orifice plate was removed from the print head and a new or clean orifice plate was then applied to the print head. This operation was not only time consuming, inconvenient and a general nuisance, but it also required the disconnection and reconnection of the fluid hoses. The potential for contamination of the orifice plate during orifice plate changes was thus substantial. With the advent of a new design by assignee for mounting the print head, wherein the orifice plate may be changed without removal of the print head from the apparatus or disconnection of the fluid hoses from the manifold, it became necessary to prevent contamination of the new or clean orifice plate when changing orifice plates. It is also desirable to minimize or eliminate the danger of contamination of the electrodes during fluid jet printing operations.

SUMMARY OF THE PRESENT INVENTION

According to the present invention, there is provided apparatus and methods for maintaining the electrodes in a clean air region free of dust and extraneous particles during operation of the fluid jet printing device. The clean air region is also maintained in accordance with the present invention about the print head during changes of the orifice plate, thereby facilitating orifice plate changes relative to the print head while the latter is disposed on the fluid jet printing apparatus. Particularly, a hood is provided and preferably overlies the print head. The lower margins of the hood define a lower opening extending substantially coextensively with the print head. The hood is provided with an air inlet which supplies clean filtered air to a chamber within the hood. The walls of the chamber are, in part, formed by a baffle which directs air from the air inlet to slots defined along the elongated lower edges of the baffle and the margins of the hood. Clean air thus flows from the inlet along the baffle to the slots and issues from the hood as curtains of clean air along opposite sides and into the region of the electrodes on opposite sides of the droplet streams issuing from the print head. The clean air curtains essentially straddle the print head and droplet streams to prevent ambient air from entering the region of the electrodes. Additionally, any air aspirated in and about the electrodes by the droplet streams is supplied through the hood and, consequently, constitutes clean air, thus eliminating undesired dust and other particulate matter.

Significantly, it has been found that the air curtains also dampen any tendency of particulate matter on the substrate from rising into the region of the electrodes. For example, when the fluid jet printing apparatus is used to chemically treat or dye textiles, lint on the fabrics as the fabric moves past the print head may short the electrodes. In accordance with the present invention, however, such lint is maintained by the clean air curtains away from the region of the electrodes.

The air flowing through the hood also affords a clean air region when the orifice plate is changed. To change orifice plates, the print head, including the manifold and orifice plate, is rotated 180° about a longitudinal axis such that the orifice plate overlies the manifold. The dirty or damaged orifice plate may then be unclamped from the manifold and withdrawn. A new plate housed in a protective sleeve may then be introduced lengthwise through an opening in one side of the fluid jet apparatus support frame, and only once the end of the sleeve is within the curtain is the plate pulled lengthwise out of the sleeve. A new orifice plate is applied lengthwise by hooking a hole on one end over a pin on the print head and pulling the sleeve out through the frame opening. The plate is then clamped to the manifold. It will be appreciated that such removal and replacement of the orifice plate lies within the encapsulating clean air curtains provided by the hood. Consequently, the potential for invasion of the region of the orifice plate during changes thereof as well as the region of electrodes during fluid jet operation by particulate matter is thus substantially minimized or eliminated.

Further, when the fluid jet printing apparatus is not operating, the hood may be maintained in a clean condition. For this purpose, flaps are provided along the opposite margins of the hood about the lower opening. These flaps are pivotally mounted on the hood and may be moved between positions opening and closing the hood opening. When the fluid jet printing apparatus is shut down, the flaps are rotated to close the hood opening and are maintained in the closed position by suitable clamps.

Accordingly, in one embodiment of the present invention, there is afforded apparatus for providing a curtain of air about the print head of an ink jet printer comprising a hood having an elongated opening at one end thereof in opposition to the print head, the hood having an inlet for receiving air into the hood, together with means carried by the hood for directing air from the air inlet for exit through the opening along at least one side of the hood to form an elongated air curtain along the corresponding side of the print head. Preferably, the interior of the hood is provided with a pair of baffles spaced from the side walls of the hood terminating in outlets adjacent the opposite sides of the hood opening to form a pair of laterally spaced air curtains issuing from opposite lower sides of the hood, respectively.

In another aspect of the present invention, there is provided in an ink jet printing apparatus having an elongated print head assembly including a manifold and an orifice plate for receiving fluid from the manifold and forming droplet streams directed generally toward a substrate, an elongated hood overlying the print head and lying generally coextensive therewith for providing curtains of clean air about opposite sides of the print head, the hood having an elongated opening at its lower end in opposition to the print head, the hood having an inlet for receiving clean air, together with means for directing air from the inlet through the opening to form discrete curtains of air along opposite sides of the print head to maintain the print head within a clean air region. Preferably, the air forms a curtain which wholly envelops the print head on its sides and ends, i.e., a laterally closed air curtain is formed.

In a still further aspect of the present invention, there is provided a method of forming a clean air region about an elongated ink jet printing head and precluding entry of ambient air about the print head caused by air aspiration resulting from the flow of the ink droplet streams, including the steps of providing a hood having a clean air inlet and an elongated opening at one end substantially coextensive in length with the print head and in opposition thereto and directing air from the air inlet through the hood for issuance from slots formed in the hood along opposite sides thereof to form air curtains for flow along opposite sides of the print head substantially encapsulating the print head within the air curtains whereby the print head lies within a clean air region, any aspirated air resulting from the droplet stream being supplied by the clean air from the hood.

Accordingly, it is a primary object of the present invention to provide a clean air hood for a fluid jet printing apparatus for maintaining a clean air region about the print head adjacent the electrodes during operation of the ink jet printing device and when changing orifice plates as well as methods affording a clean air region in and about the fluid jet print head.

These and further objects and advantages of the present invention will become more apparent upon reference to the following specification, appended claims and drawings.

DETAILED DESCRIPTION OF THE PRESENTLY PREFERRED EXEMPLARY EMBODIMENT

Figure 1:
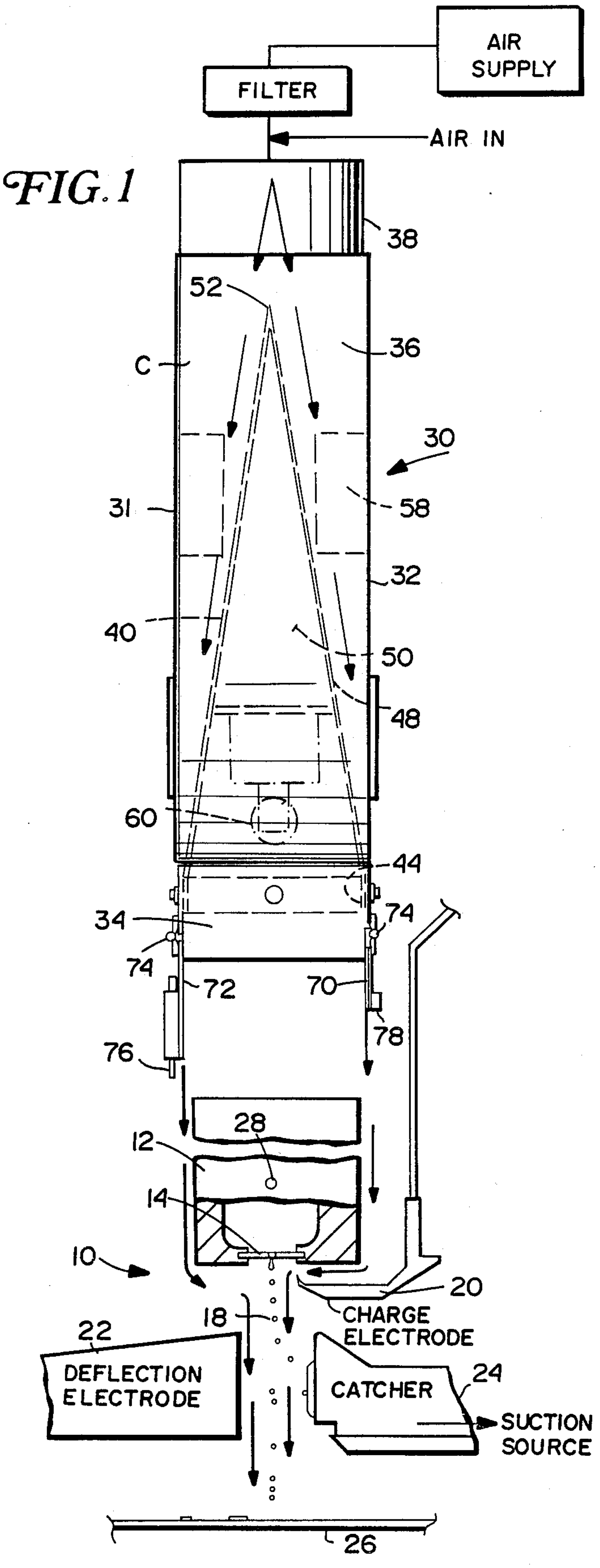
FIG. 1 is a schematic end view of a clean air hood for fluid jet printing constructed in accordance with the present invention and illustrated superposed over a print head and underlying electrodes, the latter, in turn, being superposed over a substrate.

Fluid jet printing apparatus with which the clean air hood of the present invention is used is generally designated 10, as schematically illustrated in FIG. 1. Such apparatus 10 includes an elongated fluid distribution head or bar 12 having, in operative fluid jet printing position, an orifice plate 14 releasably clamped to the underside of head 12 and through which orifice plate 14 fluid, e.g., ink, dye or other chemicals, from a reservoir in head 12, issues to form a plurality of fluid filaments which form plural fluid droplet streams 18. The fluid filaments, as they issue from orifice plate 14, are selectively and individually charged by an elongated charge electrode 20. The charge electrode 20 forms part of a pattern generator and includes a plurality of electrodes disposed in side-by-side relation along the length of charge electrode 20 whereby selected droplet streams 18 can be electrostatically charged or not, as desired. The droplet streams 18 subsequently pass through an electrostatic deflection field provided by a deflection electrode 22 on the opposite side of the droplet streams 18 from a droplet catcher 24. Droplets which are charged are thus deflected by deflection electrode 22 toward droplet catcher 24, the deflected and caught droplets being removed from droplet catcher 24 by a suction source, not shown, for recycling back to the reservoir in head 12. Uncharged droplets proceed toward substrate 26 for deposition thereon and thus print the desired indicia, patterns and the like.

It will be appreciated that although the description herein is presented with respect to a fluid jet printer having selectively and individually chargeable electrodes, the present invention is likewise applicable to those fluid jet printers having a single ribbon or strip-type charge electrode for selectively charging or not all filaments forming the droplet streams throughout the full length of the print head. An example of the latter type of fluid jet printing apparatus is described and illustrated in U.S. Pat. No. 4,639,737 of common assignee herewith.

Figure 5:
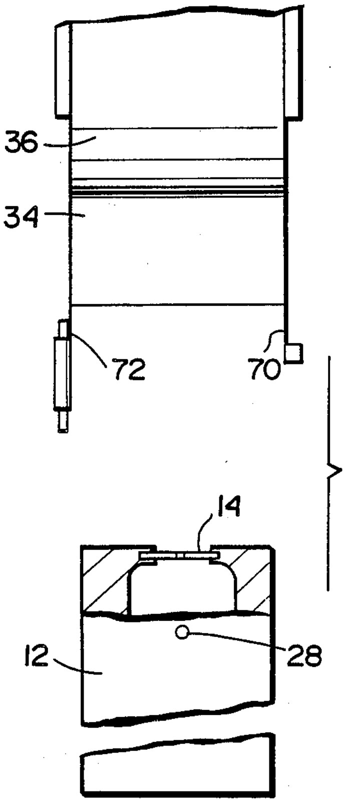
FIG. 5 is a view similar to FIG. 1 illustrating the print head in an inverted position for changing the orifice plate.

The print head 12 is mounted at each end in a support frame, not shown, for pivotal movement about an axis designated 28, the axis extending lengthwise of print head 12. Orifice plate 14 is substantially coextensive in length with print head 12 and is releasably clamped thereto, by clamps, not shown. The print head, electrode and substrate are illustrated in FIG. 1 in their operational condition whereby fluid from the reservoir within print head 12 passes through the orifices of orifice plate 14 for deflection or deposition on substrate 26 in accordance with the presence or absence of a charge applied to the filaments. As indicated previously, the orifice plate must be periodically changed and to accomplish that, the electrodes are swung, by structure not shown, outwardly away from or to opposite sides of print head 12. Print head 12 is then pivoted 180° about axis 28 such that the orifice plate 14 is exposed along the upper side of the print head, as illustrated in FIG. 5. Holes, not shown, are provided in the support structure through which the old orifice plate may be removed and the new or clean orifice plate inserted for securement to the print head.

Figure 2:
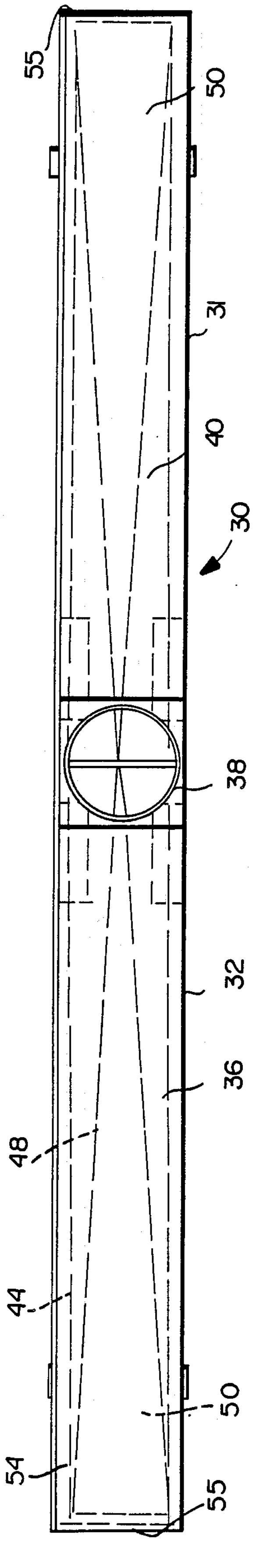
FIG. 2 is a plan view of the clean air hood hereof.
Figure 3:
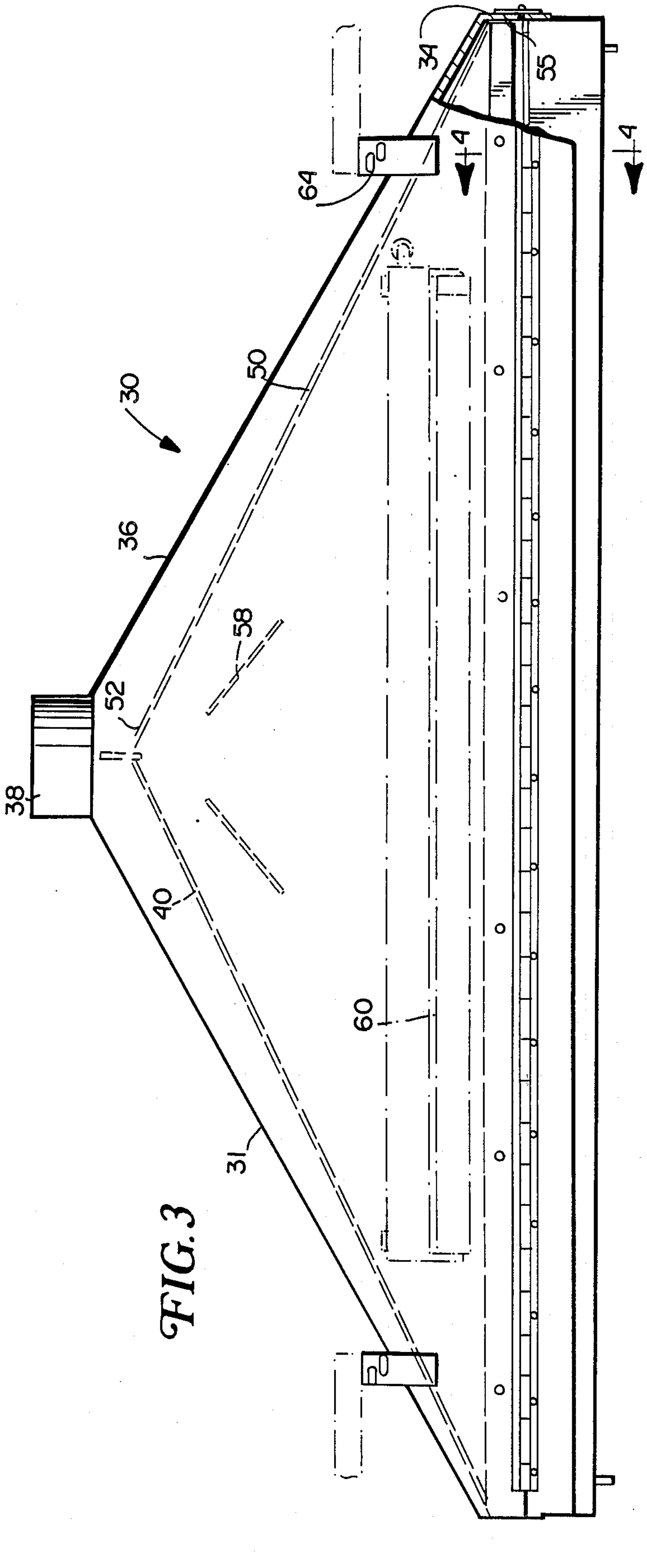
FIG. 3 is a side elevational view thereof with parts broken out and in cross-section.

In order to provide a clean air region about the droplet stream and to dampen any tendency of particles to rise from the substrate into the region of the electrodes during operation, as well as to provide a clean air region about orifice plate during changes of the orifice plates, there is provided a clean air hood, generally designated 30, constructed in accordance with the present invention. Clean air hood 30, as best illustrated in FIGS. 2 and 3, includes an outer housing 31 having opposed spaced, generally parallel, side walls 32, end walls 34, and upwardly tapered inclined end walls 36 joining the upper edges of side walls 32 one to the other. The side and inclined walls 32 and 36 terminate at their upper end in an air inlet 38, which is suitably connected, by means not shown, to a source of clean air under pressure.

The interior of clean air housing 31 is provided with a generally pyramidally shaped interior baffle 40. Baffle 40 has a generally rectangular-shaped lower margin 42 with opposed side and end walls, 44 and 46, respectively, in generally parallel relation one to the other with upstanding inclined side and end walls 48 and 50, respectively, extending upwardly to terminate in an apex 52. Thus, a chamber C is formed within hood 30 between hood housing 31 and interior baffle 40.

From a review of FIG. 2, it will be appreciated that the side wall margins 44 and the side walls 32 of housing 30 form elongated slots 54 along opposite sides of the clean air hood 30. Also, the end walls 34 of outer housing 31 and the end wall margins of baffle 40 form slots 55 at opposite ends of the hood in communication with chamber C. As best illustrated in FIG. 2, those slots 54 diverge in plan view from the central portion of the hood outwardly toward the opposite ends of the hood. That is, the walls of the baffle are slightly angled toward one another from the middle and thus converge at either end, so that the slots 54 are wider at the ends than in the middle. This assures a full supply of air along the slots. Mechanical interconnection is provided between interior baffle 40 and housing 31 by means of spacers 56 (FIG. 4) extending between the lower margins of the side walls 32 of housing 31 and lower side walls 44 of interior baffle 40. Suitable nuts and bolts, 58 and 59, respectively, are provided to secure the housing and baffle one to the other. Additional interior baffles 58 are provided between the side walls 48 and 32 of the baffle and housing, respectively, for directing air from inlet 38 through chamber C for substantial even distribution of air through the elongated slots 54 along opposite sides of hood 30. Air is also distributed from Chamber C through end slots 55.

A light source, preferably a fluorescent light bulb 60, is provided within baffle 40 suitably mounted to and between the side walls 48 thereof. Light 60 therefore provides illumination of the print head during orifice plate changing operations as well as for viewing the fluid jet printing apparatus in operation. Suitable support structure 64 (FIG. 3) is provided on housing 31 whereby hood 30 may be supported above print head 12 by additional support structure, not shown.

Figure 4:
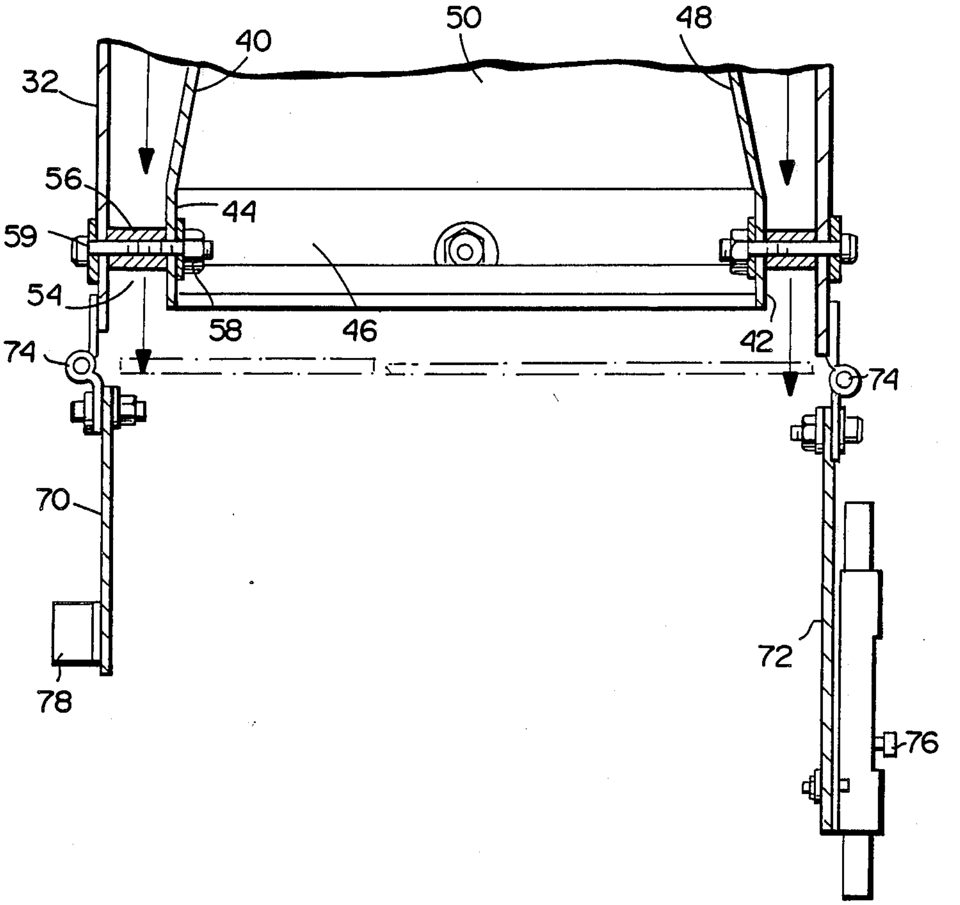
FIG. 4 is an enlarged cross-sectional view thereof taken generally about on line 4—4 in FIG. 3.

The lower edges of housing 31 support respective flaps 70 and 72 whereby the opening through the lower end of hood 30 may be selectively opened or closed as desired, as illustrated by the full and dashed line positions of flaps 70 and 72 illustrated in FIG. 4. Particularly, flaps 70 and 72 are connected along the opposite sides of housing 31 to side walls 32 by piano-type hinges 74 whereby each flap 70 and 72 may be pivoted between an open position illustrated by the full lines in FIG. 4 and a hood closed position illustrated by the dashed lines in FIG. 4. A suitable slidable bolt 76 and a keeper 78 are mounted on flaps 72 and 70, respectively, whereby the flaps may be maintained in the hood closed position by engagement of the bolt with the keeper.

In the normal operation of the fluid jet printing apparatus with the clean air hood 30 hereof as illustrated in FIG. 1, air is supplied to inlet 38 and passes through chamber C to slots 54. Specifically, the air flows in passages defined between the tapered inclined end walls of the housing and baffle for spillover into passages defined between the side and end walls of the interior baffle and housing, respectively. The air then issues through slots 54 along opposite sides of hood 30 and slots 55 (See FIG. 2) at the end of the hood, substantially coextensively with the entire periphery of the hood and passes as a continuous air curtain along the sides of print head 12, as illustrated by the arrows in FIG. 1. Thus, the air substantially straddles or encapsulates the entirety of the print head. The air curtains then pass from the sides of print head 12 inwardly toward droplet streams for passage on respective opposite sides thereof and respectively between streams 18 and deflection electrode 22 on the one hand and streams 18 and charge electrode 20 and catcher 24 on the other hand. As will be appreciated, the air flow is not of great volume or velocity, so the droplet trajectories are not disturbed. The curtains of air are thus applied to substrate 26 on opposite sides of the area of deposition of the droplets. This is significant because the curtains of air dampen any tendency of particulate matter carried by the substrate, for example lint, when the substrate is a textile fabric which is being dyed or patterned, from migrating into the region of the electrodes. Thus, the air curtains minimize or prevent the tendency of particulate matter to contact the electrodes and which particulate matter may otherwise short the electrodes or undesirably affect the fields generated thereby. That is, the curtains of air dampen any tendency for particulate matter to adhere to the electrodes and interfere with the electrostatic fields generated thereby. The clean air hood hereof therefore provides a clean air region about the droplet stream and adjacent the substrate to effectively maintain the region of the electrodes free of particulate matter during operation of the fluid jet printing apparatus.

Additionally, the clean air hood also maintains a clean air region about the orifice plate during orifice plate changes. Referring now to FIG. 5, print head 12 is illustrated rotated 180° from its operating position into a position where orifice plate 14 may be removed. That is, orifice plate 14 is removed by unclamping it from print head 12. A new or clean orifice plate 14, together with a sleeve housing the new orifice plate, is disposed through an aperture in the support structure. With the sleeve and orifice plate lying wholly within the air curtain, the orifice plate is secured to print head 12 by hooking an aperture, not shown, on its end about a pin, also not shown, carried by the print head 12. The sleeve is then withdrawn through the support structure aperture and the orifice plate is then drawn taut on the print head. The clamps are then positioned to secure the orifice plate in sealing relation to print head 12. It will be appreciated that the curtains of air issuing from slots 54 and 55 of the clean air hood during the orifice plate changing operation surround the print head. The clean air curtains therefore maintain a clean air region about the orifice plate during orifice plate changing operations.

It will thus be appreciated that the objects of the present invention are fully accomplished in that there has been provided a clean air hood for a fluid jet printing apparatus wherein clean air is provided in the form of curtains which surround the droplet streams in the area between the electrodes to minimize or eliminate any tendency of lint or other particulate matter from entering into the region between the electrodes or contacting the electrodes. Additionally, clean air curtains are provided during orifice plate changes to encapsulate the latter whereby the new and clean orifice plate is not substantially exposed to particulate matter which would otherwise interfere with the issuance of fluid through the orifices of the plate during printing. It will also be appreciate that the flow of clean air in the form of the two laterally spaced curtains of air is at very low pressure when the fluid jet printing apparatus is operating. Thus, the droplet stream will not be affected by this very low pressure air. When changing orifice plates, however, it may be desirable to elevate the pressure and this can be effected by suitable well-known means.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. Apparatus for providing a curtain of air about the elongated print head of a fluid jet printer comprising:

a hood having an elongated opening at one end thereof in opposition to and spaced above the print head;

said hood having an air inlet; and means carried by said hood for directing air from said inlet for exit through said opening along one side of said hood to form an elongated air curtain along the corresponding side of the print head;

said hood having opposed spaced side walls, said directing means including a pair of baffles carried within said hood and respectively spaced from the opposed side walls, said baffles and corresponding side walls terminating in discrete air outlets adjacent opposite sides of said opening to form a pair of discrete, laterally spaced, air curtains issuing from opposite sides of the hood, respectively.

2. Apparatus according to claim 1 including a source of illumination carried by said hood for illuminating the region beyond said opening through said opening.

3. Apparatus for providing a curtain of air about the elongated print head of a fluid jet printer comprising:

a hood having an elongated opening at one end thereof in opposition to the print head;

said hood having an air inlet;

means carried by said hood for directing air from said inlet for exit through said opening along one side of said hood to form an elongated air curtain along the corresponding side of the print head; and said hood having a pair each of side and end walls, said air directing means comprising a baffle having a generally pyramidal shape and disposed within and spaced from the side and end walls of said hood to define with said side walls air passages having air outlets terminating adjacent the opening to form elongated curtains of air issuing from said head for passage along opposite sides of the print bar.

4. Apparatus according to claim 3 wherein said end walls of said hood incline toward one another in a direction away from said opening and terminate in said inlet, said side walls of said hood terminating at ends thereof remote from said opening in said inlet, said pyramidal-shaped baffle being elongated in one direction with the apex of said baffle lying in registration with said inlet, said elongated baffle having inclined end walls spaced from said inclined end walls of said hood and inclining in the same general direction as said hood end walls to terminate in said apex.

5. Apparatus according to claim 4 wherein the side walls of said hood lie generally parallel one to the other, the side walls of said baffle inclining toward one another in a direction away from said opening and toward said apex thereby defining a convergent passage along each of the opposite sides of said hood in a direction toward said opening.

6. Apparatus for providing a curtain of air about the elongated print head of a fluid jet printer comprising:

a hood having an elongated opening at one end thereof in opposition to the print head;

said hood having an air inlet;

means carried by said hood for directing air from said inlet for exit through said opening along one side of said hood to form an elongated air curtain along the corresponding side of the print head;

at least one flap pivotally carried by said hood adjacent said opening and pivotal between positions substantially opening and closing said opening; and means carried by said flap for retaining said flap in said closed position.

7. Apparatus according to claim 6 including a second flap pivotally carried by said hood adjacent said opening, said flaps being pivotally connected to said hood along opposite sides thereof and pivotal between positions substantially opening and closing said opening, and means carried by said flaps and cooperable one with the other for retaining said flaps in said closed position.

8. Apparatus according to claim 6 including a second flap pivotally carried by said hood adjacent said opening, said flaps being pivotally connected to said hood along opposite sides thereof and pivotal between positions substantially opening and closing said opening, and means carried by said flaps and cooperable one with the other for retaining said flaps in said closed position.

9. In a fluid jet printing apparatus having an elongated print head assembly including a manifold and an orifice plate for receiving fluid from the manifold and forming droplet streams directed generally toward a substrate, an elongated hood overlying said print head and lying generally coextensive therewith for providing discrete curtains of clean air about opposite sides of the print head, said hood having elongated opening at the lower end thereof in opposition to and space above said print head, said hood having an inlet for receiving air, and means carried by said hood for directing air from said inlet through said opening to form discrete curtains of air along opposite sides of said print head to maintain the print head within a clean air region.

10. Apparatus according to claim 9 wherein said fluid jet printing apparatus in electrode means disposed below the orifice plate during printing operations for charging the fluid droplet streams issuing from said orifice plate, said directing means directing air through said hood opening such that said discrete curtains of air straddle said droplet streams and impinge on the substrate to maintain a clean air region about the electrode means.

11. Apparatus according to claim 10 wherein said hood has opposed spaced side walls, said directing means including a pair of baffles carried within said hood and respectively spaced from the opposed side walls, said baffles and corresponding side walls terminating in air outlets adjacent opposite sides of said opening to form a pair of laterally spaced air curtains issuing from opposite sides of the hood, respectively.

12. Apparatus according to claim 10 wherein said hood has a pair each of side and end walls, said air directing means comprising a baffle having a generally pyramidal shape and disposed within and spaced from the side and end walls of said hood to define with said side walls air passages having air outlets terminating adjacent the opening to form elongated curtains of air issuing from said head for passage along opposite sides of the print bar.

13. Apparatus according to claim 12 wherein said walls of said hood incline toward one another in a direction away from said opening and terminate in said inlet, said side walls of said hood terminating at ends thereof remote from said opening in said inlet, said pyramidal-shaped baffle being elongated in one direction with the apex of said baffle lying in registration with said inlet, said elongated baffle having inclined end walls spaced from said inclined end walls of said hood and inclining in the same general direction as said hood end walls to terminate in said apex.

14. Apparatus according to claim 13 wherein the side walls of said hood lie generally parallel one to the other, the side walls of said baffle inclining toward one another in a direction away from said opening and toward said apex thereby defining a convergent passage along each of the opposite sides of said hood in a direction toward said opening.

15. Apparatus according to claim 9 including a source of illumination carried by said hood for illuminating the region beyond said opening through said opening.

16. A method of forming a clean air region about an elongated fluid jet printing head comprising the steps of:

providing a hood having a clean air inlet and an elongated opening at one end substantially coextensive in length with the print head and in spaced opposition thereto; and directing air from the air inlet through the hood for issuance from slots formed in the hood along opposite sides thereof to form discrete air curtains for flow along opposite sides of the print head substantially encapsulating substantially the entirety of the sides of the print head within the air curtains whereby the print head lies within a clean air region.

17. The method according to claim 16 wherein the print head has an orifice plate for issuing fluid therefrom in the form of fluid droplet streams, including the steps of precluding entry of ambient air about the print head caused by air aspiration resulting from the flow of the fluid droplet stream and providing any aspirated air resulting from the droplet stream from the clean air curtains.

18. The method according to claim 16 wherein the print head has an orifice plate for issuing fluid therefrom in the form of fluid droplet streams for deposition on a substrate and electrode means disposed below the orifice plate during printing operations for charging the fluid droplet streams wherein the step of directing air includes directing air into the region of the electrode means to maintain a clean air region about the electrode means.

19. The method according to claim 18 wherein the step of directing air includes directing air onto the substrate to minimize or eliminate any tendency of particulate matter carried by the substrate from migrating to the region of the electrode means.

20. The method according to claim 16 wherein the print head has an orifice plate for issuing fluid therefrom in the form of fluid droplet streams for deposition on a substrate and electrode means disposed below the orifice plate during printing operations for charging the fluid droplet streams including the step of rotating the print head into a position such that the orifice plate lies in opposition to the hood opening whereby the orifice plate may be changed within the clean air region established by the air curtains issuing from said hood.

21. The method according to claim 20 including the steps of rotating the print head from said orifice plate changing position into a fluid jet printing position with the orifice plate disposed along the side of the print head remote from the hood opening, and wherein the step of directing air includes directing air onto the substrate, when the print head lies in its fluid jet printing position, to minimize or eliminate any tendency of particulate matter carried by the substrate from migrating to the region of the electrode means.

22. The method according to claim 20 including the steps of rotating the print head from said orifice plate changing position into a fluid jet printing position with the orifice plate disposed along the side of the print head remote from the hood opening, and wherein the step of directing air includes directing air into the region of the electrode means to maintain a clean air region about the electrode means.

* * * * *